United States Patent
Nachenberg et al.

(10) Patent No.: US 7,694,139 B2
(45) Date of Patent: Apr. 6, 2010

(54) SECURING EXECUTABLE CONTENT USING A TRUSTED COMPUTING PLATFORM

(75) Inventors: Carey S Nachenberg, Northridge, CA (US); Bruce McCorkendale, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1725 days.

(21) Appl. No.: 10/280,665

(22) Filed: Oct. 24, 2002

(65) Prior Publication Data

US 2004/0083366 A1   Apr. 29, 2004

(51) Int. Cl.
H04L 9/32 (2006.01)
(52) U.S. Cl. ...................... 713/170; 713/176
(58) Field of Classification Search ............... 726/32, 726/10, 30; 380/241, 282; 713/187, 188, 713/170, 176
See application file for complete search history.

(56) References Cited

U.S. PATENT DOCUMENTS

| | | | | |
|---|---|---|---|---|
| 5,359,659 A * | 10/1994 | Rosenthal | ................ | 726/24 |
| 5,421,006 A * | 5/1995 | Jablon et al. | ................ | 714/36 |
| 5,440,723 A * | 8/1995 | Arnold et al. | ................ | 714/2 |
| 5,638,446 A * | 6/1997 | Rubin | ................ | 705/51 |
| 5,892,904 A * | 4/1999 | Atkinson et al. | ................ | 726/22 |
| 5,958,051 A * | 9/1999 | Renaud et al. | ................ | 726/22 |
| 6,088,803 A | 7/2000 | Tso et al. | | |
| 6,243,468 B1 * | 6/2001 | Pearce et al. | ................ | 380/255 |
| 6,321,334 B1 * | 11/2001 | Jerger et al. | ................ | 726/1 |
| 6,367,012 B1 * | 4/2002 | Atkinson et al. | ................ | 713/176 |
| 6,662,020 B1 * | 12/2003 | Aaro et al. | ................ | 455/552.1 |
| 6,694,434 B1 * | 2/2004 | McGee et al. | ................ | 713/189 |
| 6,766,353 B1 * | 7/2004 | Lin et al. | ................ | 709/203 |
| 7,103,782 B1 * | 9/2006 | Tugenberg et al. | ................ | 713/194 |
| 2002/0016913 A1 * | 2/2002 | Wheeler et al. | ................ | 713/170 |
| 2002/0078380 A1 * | 6/2002 | Lin et al. | ................ | 713/201 |
| 2002/0104006 A1 * | 8/2002 | Boate et al. | ................ | 713/186 |
| 2002/0120851 A1 * | 8/2002 | Clarke | ................ | 713/178 |
| 2002/0174341 A1 * | 11/2002 | Logue et al. | ................ | 713/179 |
| 2003/0061494 A1 * | 3/2003 | Girard et al. | ................ | 713/189 |

(Continued)

OTHER PUBLICATIONS

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc_pelican.html.

(Continued)

Primary Examiner—Christopher J Brown
(74) Attorney, Agent, or Firm—Fenwick & West LLP

(57) ABSTRACT

A software development system (SDS) (228) digitally signs software (230) developed on the system. The SDS (228) executes on a computer system (112) having a trusted computing platform. The platform includes protected areas (220, 226) that store data and cannot be accessed by unauthorized modules. A code signing module (232) executing in a protected area (226) obtains a private/public key pair and a corresponding digital certificate. The SDS (228) is configured to automatically and transparently utilize the code signing module (232) to sign software (230) produced by the system. End-user systems (114) receive the certificate with the software and can use it to verify the signature. This verification will fail if a parasitic virus or other malicious code has altered the software (230). Accordingly, the SDS (228) greatly reduces the risk of malicious code executing on the end-user computer system (114).

19 Claims, 3 Drawing Sheets

U.S. PATENT DOCUMENTS

2004/0003288 A1* 1/2004 Wiseman et al. ............. 713/201
2006/0100010 A1* 5/2006 Gatto et al. .................... 463/29
2007/0277037 A1* 11/2007 Langer ....................... 713/176

OTHER PUBLICATIONS

Trusted Computing Platform Alliance web pages. "TCPA / Palladium Frequently Asked Questions," pp. 1-13 [online], Ross Anderson [retrieved on Oct. 10, 2002]. Retrieved from the Internet: <http://www.cl.cam.ac.uk/~rja14/tcpa-faq.html>.

Microsoft web pages, "Microsoft Palladium: A Business Overview," pp. 1-10 [online], Amy Carroll, Mario Juarez, Julia Polk and Tony Leininger, Aug. 2002 [retrieved on Oct. 10, 2002]. Retrieved from the Internet: <http://www.microsoft.com/PressPass/features/2002/jul02/0724palladiumwp.asp>.

Trusted Computing Platform Alliance, "Building a Foundation of Trust in the PC," pp. 1-9, Jan. 2000.

Microsoft web pages, "Microsoft Palladium Initiative—Technical FAQ," pp. 1-8 [online], Aug. 2002 [retrieved on Oct. 10, 2002]. Retrieved from the Internet: <http://www.microsoft.com/technet/security/news/PallFAQ2.asp?frame=true>.

* cited by examiner

SECURING EXECUTABLE CONTENT USING A TRUSTED COMPUTING PLATFORM

BACKGROUND OF THE INVENTION

1. Field of the Invention

This invention pertains in general to computer security and in particular to preventing malicious and/or unauthorized code from executing on a computer system.

2. Background Art

A parasitic computer virus typically infects a computer system by inserting viral code into other executable programs stored on the computer system. This code can infect other files and/or computer systems, destroy data on the computer system, or perform other malicious actions. Other types of malicious code, including Trojan horses, worms, keystroke grabbers, etc. can also damage computer systems. Thus, there is a strong desire to prevent viruses and other malicious code from infecting and/or executing on a computer system.

One technique for preventing virus infections and other attacks is to install anti-virus software on the computer system in order to detect the presence of viruses and other malicious code. Anti-virus software utilizes various tools, such as string scanning and emulation, to detect malicious code and prevent it from damaging the computer system. However, certain types of malicious code, such as polymorphic, metamorphic, and obfuscated entry point threats, are difficult for anti-virus software to detect.

Another technique for preventing attacks is to establish mechanisms for detecting whether software has been altered by a virus or other malicious code. Code signing is one technique for detecting alterations. Digitally signed code includes values in computer programs that the computer system can use to detect whether the code has been altered. Code signing thus prevents tampering with executable content.

However, existing digital signing schemes are cumbersome. A software developer must obtain a digital certificate from a certificate authority (CA) in order to sign code and this is often a costly and tedious process. Moreover, the developer must securely manage the digital certificate to keep it from being compromised. Since most software developers will not go to the trouble of obtaining such a certificate, most software is not signed. Therefore, most computer systems are configured to execute both signed and unsigned code, meaning that the systems are susceptible to parasitic viruses.

Accordingly, there is a need in the art for a mechanism that allows software developers to easily obtain certificates and digitally sign computer programs. Such a mechanism will significantly reduce the threat of parasitic virus infection and other attacks by making it easier for end-users to detect malicious code.

DISCLOSURE OF INVENTION

The above need is met by a code signing module (232) that executes in the protected area (226) of a developer computer system (112) having a trusted computing platform and automatically signs (316) software developed on the system. A typical computing environment contains a certificate authority (CA) (110), a developer computer system (112), and an end-user computer system (114) in communication via a network (116). The CA (110) is an entity that issues and manages security credentials, keys, and/or other data in order to support authentication, verification, and encryption.

The developer computer system (112) includes a trusted computing platform having a protected area (222) in storage (208) and a protected area (226) in memory (206). Only authorized modules can access these areas. A software development system (SDS) (228) executes on the developer computer system (112). A developer uses the SDS (228) to develop software (230).

A code signing module (232) executes in the protected area (226) of memory (226) on the developer computer system (112) and communicates with the CA (110) to obtain a private/public key pair and a certificate based on the public key. In one embodiment, the certificate also includes a machine ID (203) that uniquely identifies the developer computer system (112). The code signing module (232) stores the private key (234) in a protected area (222).

When the SDS (228) builds a software module (230), it passes the software to a protected area. The code signing module (232) uses the private key (234) to digitally sign (316) the software. As part of the signing process, the code signing module (232) incorporates the certificate into the file containing the software (230). The signed software (230) is passed back into an unprotected area of the developer computer system (112).

The signed software is distributed to an end-user who executes the software (230) on the end-user system (114). The end-user system (114) uses the certificate to verify (320) the signature of the software (230). If the signature does not verify, then there is a high probability that the software has been tampered with by a parasitic virus or other malicious entity. In one embodiment, the end-user system (114) is configured to execute only signed software and to verify each piece of software's signature before executing it. This embodiment prevents the computer system (114) from executing software that has been altered, thereby significantly decreasing the risk that a parasitic virus or other malicious code will harm the computer system.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
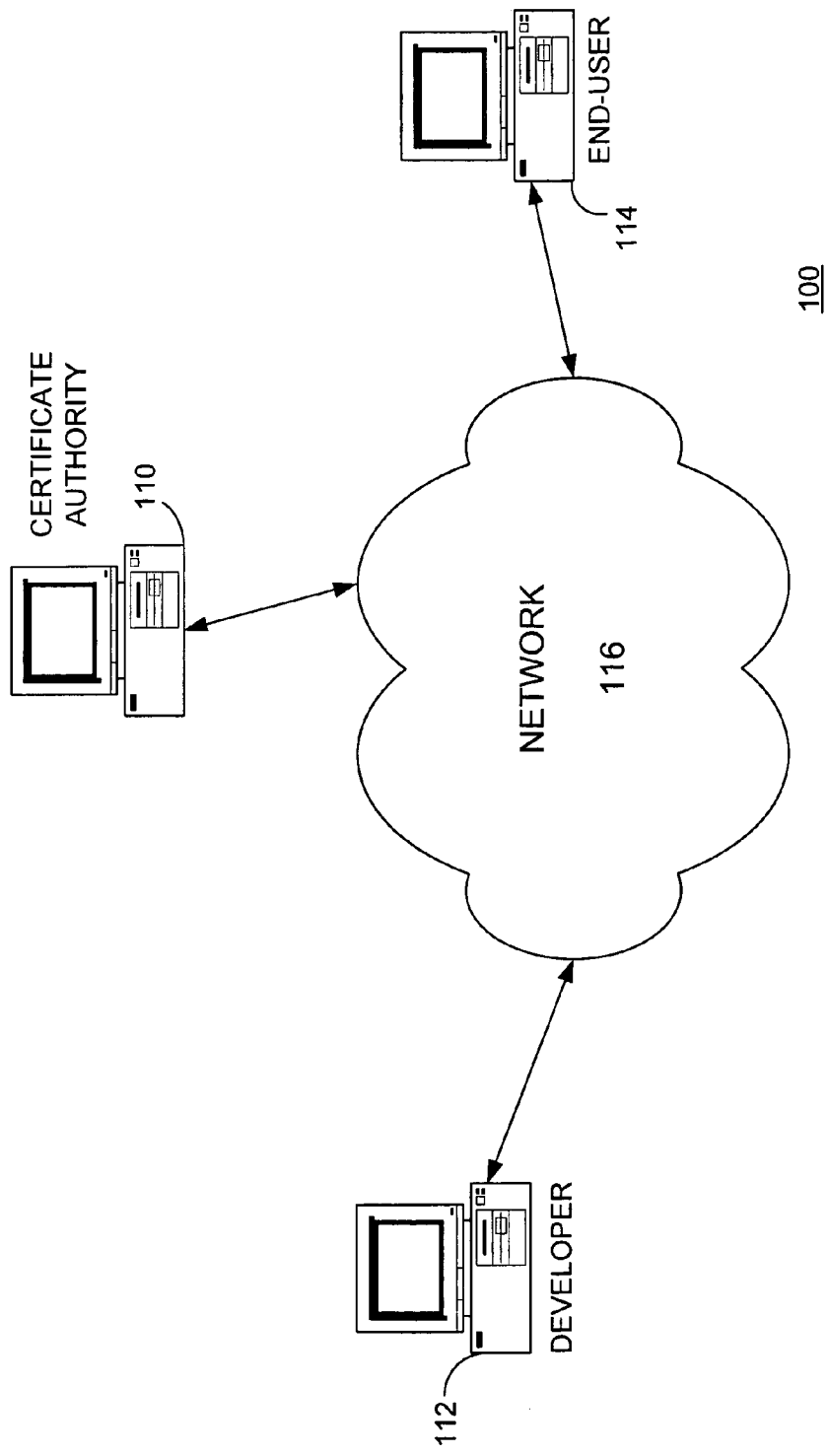
FIG. 1 is a high-level block diagram of a computing environment 100 according to one embodiment of the present invention.

FIG. 1 is a high-level block diagram of a computing environment 100 according to one embodiment of the present invention. FIG. 1 illustrates a certificate authority (CA) 110, a developer computer system 112, and an end-user computer system 114 connected by a network 116.

The CA 110 is an entity that issues and manages security credentials, keys, and/or other data in order to support authentication, verification, and encryption. The CA 110 issues "certificates" containing encrypted information that can be decrypted using the CA's widely-known public key. A third party, such as the end-user computer system 114, can use the CA's public key to decrypt the certificate and verify that the information contained therein has not been altered. Therefore, the functionality provided by the CA 110 allows information to be communicated from the developer computer system 112 to the end-user computer system 114 without tampering (i.e., the end-user computer system is able to detect any tampering). VeriSign, Inc. is an example of a commercial CA 112.

In one embodiment, the developer system 112 contains a trusted computing platform and is utilized by a developer to develop computer programs (sometimes referred to as "software" or "code") for execution on the end-user system 114. In one embodiment, the developer system 112 communicates with the CA 110 to obtain certificates and uses the certificates to "sign" software developed on the system. The signing happens in a secure area of the trusted computing platform in order to prevent malicious code from compromising the signature. Although only a single developer system 112 is shown in FIG. 1, it will be understood that embodiments of the present invention can have thousands or millions of developer systems.

The trusted computing platform utilized by the developer system 112 implements technologies and protocols that allow third parties to "trust" the platform for certain purposes. The platform can "prove" to the third parties that the platform is trustworthy and has not been altered in a way that would betray the trust. In one embodiment, the trusted computing platform is similar to a conventional computer system, except that the trusted platform has a secure storage that can store data in a location that is tamper-proof and inaccessible to non-trusted software and has a secure execution environment that executes tamper-proof software. Examples of trusted computing platforms that can be utilized with the present invention include the platform advocated by the Trusted Computing Platform Alliance (TCPA) of Hillsboro, Oreg., and the "Palladium" platform advocated by Microsoft Corp. of Redmond, Wash., for the Windows family of operating systems.

In one embodiment, the end-user computer system 114 is a conventional computer system executing, for example, a Microsoft Windows-compatible operating system (OS), Apple OS X, and/or a Linux-compatible OS. The end-user computer system 114 is adapted to execute software developed on the developer computer system 112. Although only one end-user computer system 114 is shown in FIG. 1, embodiments of the present invention can have thousands or millions of such systems. Moreover, an end-user computer system 114 can be a developer computer system 112 and vice versa depending upon the context. For example, a developer might execute certain end-user software on the developer computer system 112.

The end-user computer system 114 includes functionality for verifying a signature in the software received from the developer system 112. If the code has been tampered with by, for example, a parasitic virus, the signature verification will fail and the end-user computer system 114 will detect the tampering. In one embodiment, the end-user computer system 114 is configured to execute only signed code. This embodiment substantially reduces the risk of infection by a parasitic virus since the computer system 114 will quickly detect the presence of a virus.

The network 116 represents the communication pathways between the CA 110, developer system 112, and end-user system 114. In one embodiment, the network 116 is the Internet. As such, the CA 110 and computer systems 112, 114 can use conventional communications technologies such as the secure sockets layer (SSL), Secure HTTP (S-HTTP), and/or virtual private networks (VPNs) to engage in secure communications over network links. The network 116 can also utilize dedicated or private communications links that are not necessarily part of the Internet. In one embodiment, all or part of the network 116 includes non-electronic links. For example, the developer may communicate with the CA 110 via U.S. mail, voice telephone, etc. All of these means of communication are supported and can be included within certain embodiments of the network 116 of FIG. 1.

Figure 2:
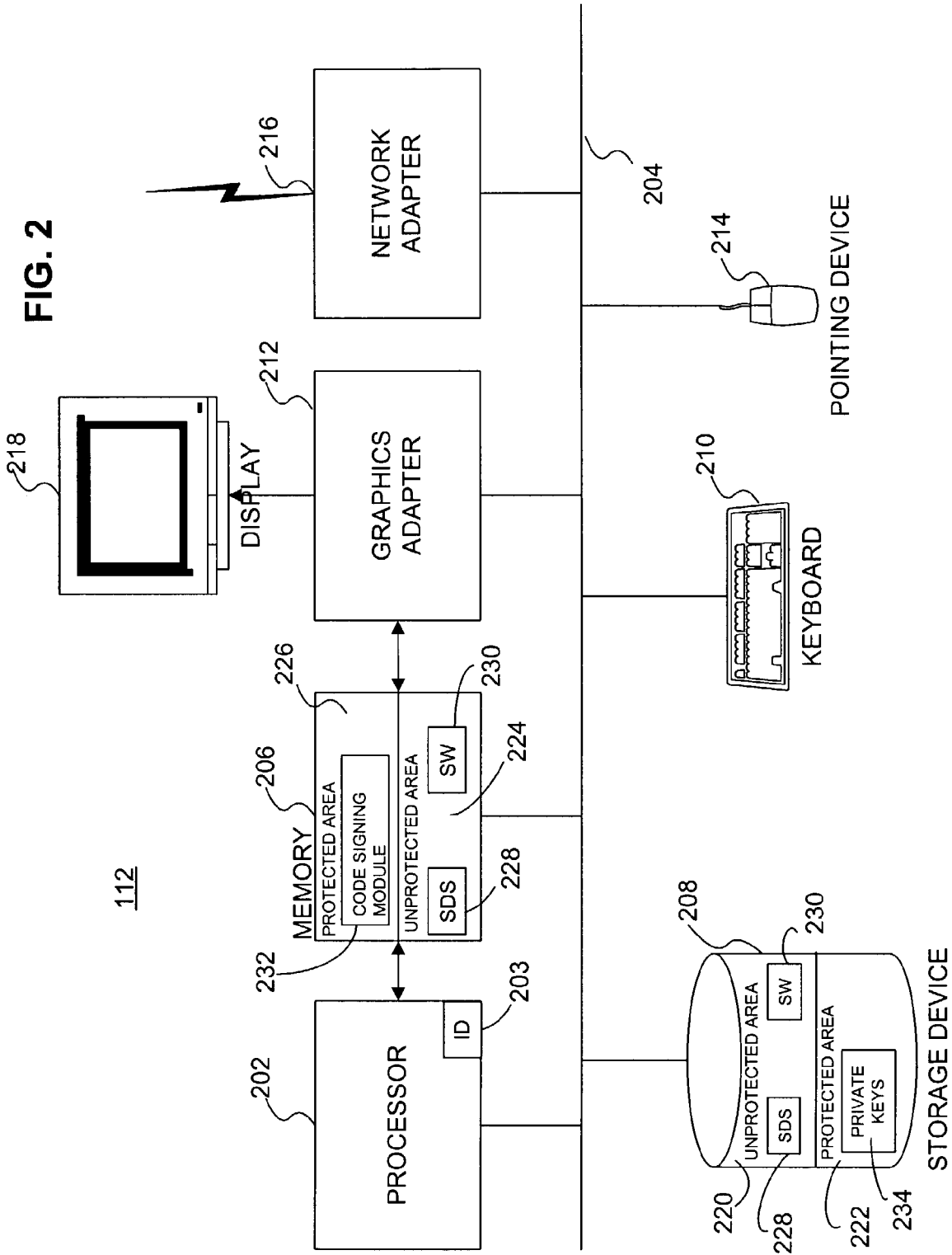
FIG. 2 is a high-level block diagram illustrating the developer computer system 112 according to one embodiment of the present invention.

FIG. 2 is a high-level block diagram illustrating the developer computer system 112 according to one embodiment of the present invention. In addition, the end-user system 114 is also similar to the system illustrated in FIG. 2, although the end-user system might not include a trusted computing platform or software development functionality. As is known in the art, the computer system 112 is adapted to execute computer program modules for providing functionality described herein. As used herein, the term "module" refers to computer program logic for providing the specified functionality. A module can be implemented in hardware, firmware, and/or software.

FIG. 2 illustrates at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. In one embodiment, the processor 202 includes special-purpose functionality for supporting the trusted computing platform, such as instructions allowing creation of and interfacing with protected storage areas and instructions for executing programs in a "trusted" mode that cannot be interrupted or compromised. In one embodiment, the processor is also compatible with general-purpose processors, such as INTEL x86, SUN MICROSYSTEMS SPARC, and/or POWERPC processors. In one embodiment, the processor 202 holds an identification value 203 (referred to as the "machine ID"). The machine ID 203 uniquely identifies the processor 202, the computer system 112, and/or the trusted computing platform. In another embodiment, the machine ID 203 is stored elsewhere in the computer system 200.

The storage device 208 illustrated in FIG. 2 is representative of one or more storage devices that are associated with the computer system. The storage devices may include, for example, one or more hard disk drives, a smart card, a memory stick, nonvolatile random access memory (NVRAM), a compact disk (CD) or DVD drive, etc. The storage device 208 includes an unprotected area 220 and a protected area 222. The unprotected area 220 holds information that is accessible to all of the components and modules in the computer system 112. The protected area 222, in contrast, holds information that is accessible only to itself and/or to a set of other trusted components and modules in the computer system 112. For example, in one embodiment the unprotected area 220 is a conventional hard disk drive holding unencrypted data while the protected area is a smart card or other storage device that is accessible to only components and modules having certain permissions and cryptographic keys.

The memory 206 holds instructions and data utilized by the processor 202. In one embodiment the memory 206 is a random access memory (RAM). Depending upon the embodiment, the memory 106 may also include firmware, read-only memory (ROM), and/or NVRAM. As with the storage device, the memory is divided into unprotected 224 and protected 226 areas. In one embodiment, both the unprotected 224 and protected 226 areas are held in RAM, but the pages of memory forming the protected area 226 are walled-off and hidden by the trusted computing platform so that only certain components and modules can view or modify the data held therein. Modules stored in the storage device 208 are typically loaded into the memory 206 in order to be utilized by the processor 202. A secure pathway (not shown) over the bus 204 allows instructions and data to be securely transmitted between the protected area 222 of the storage device 208 and the protected area 226 of the memory 206. In addition, the program modules executing in protected memory are typically signed. For these reasons, program modules executing in protected memory 226 and data held in the protected storage 222 are "trusted" by other modules in the system 112 and by third party systems.

The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 112 to the network 116.

In one embodiment, the developer computer system 112 includes a software development system module (referred to as the "SDS") 228 that the developer uses to develop software 230 adapted for execution on end-user computer systems 114. In one embodiment, the SDS 228 includes functionality allowing the developer to write, compile, link, and debug executable code. For example, Visual Studio available from Microsoft Corp. can be utilized as the SDS 228. In one embodiment, at least a portion of the SDS 228 executes in the unprotected area 224 of memory 206.

The SDS 228 includes a code signing module 232 for signing the software 230 developed with the SDS. In one embodiment, the code signing module 232 is integrated into SDS 228. In another embodiment, the code signing module 232 is a discrete module that is called by the SDS 228 or the developer once the software 230 is produced. In one embodiment, the code signing module 232 is implemented as an automated process that automatically and transparently (i.e., without developer intervention) signs all software developed with the SDS 228. This automated embodiment greatly reduces the burden on the part of the developer to produce signed code.

In one embodiment, the code signing module 232 executes in the protected area 226 of memory 206 and is itself signed. The SDS 228 uses an application programming interface (API) of the code signing module 232 and/or trusted computing platform to authenticate itself to the code signing module and pass the developed software 230 from the unprotected area 224 to the protected area 226 of memory 206. The SDS 228 authenticates itself in order to prevent malicious code from impersonating the SDS 228 and improperly accessing the functionality of the code signing module 232. Then, the code signing module 232 electronically signs the software 230 and passes the signed software back to the unprotected area 224. At this point, the developer can distribute the signed software to the end-user computer systems 114.

In another embodiment, the code signing module 232 executes in a different computer system than the one in which the SDS 228 executes. In this embodiment, the code signing computer system is connected to the developer computer system 112 via a secure network connection and/or has another secure pathway for accepting in a trusted manner the software 230 developed with the SDS 228. For example, a corporation or other enterprise that has multiple developers developing the software 230 can have a dedicated code signing computer system that signs software developed by the enterprise. The software 230 can be entered into the code signing computer system via a secure network connection or by physically loading media containing the software into a suitable input device in the system.

Figure 3:
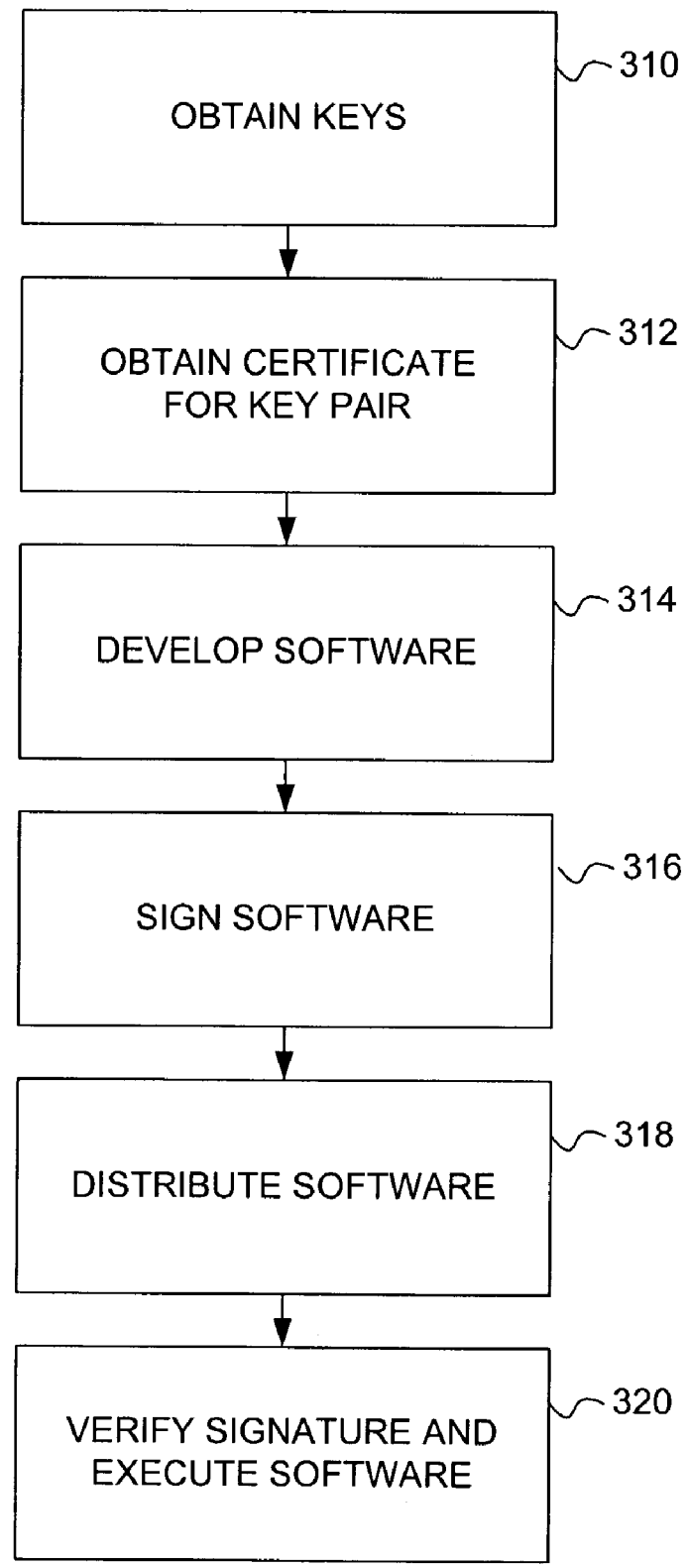
FIG. 3 is a flow chart illustrating steps for developing, distributing, and executing signed code according to one embodiment of the present invention.

FIG. 3 is a flow chart illustrating steps for developing, distributing, and executing signed code according to one embodiment of the present invention. It should be understood that these steps are illustrative only, and that other embodiments of the present invention may perform different and/or additional steps than those described herein in order to perform different and/or additional tasks. Furthermore, the steps can be performed in different orders than the steps described herein.

The code signing module 232 or another module executing in the protected area 226 of memory 206 obtains 310 one or more private/public key pairs that can be used to sign software using public-key-based techniques. In one embodiment, the code signing module 232 obtains the key pairs from the CA 110 or another entity via a secure network 116 link. In another embodiment, the code signing module 232 or another module executing in the protected area 226 of memory 206 generates the keys itself. In another embodiment, the trusted computing platform itself has a unique private/public key pair that modules executing on the platform can utilize for digital signatures and other purposes.

As is known in the art, a key is a mathematical value, such as a long integer, that is usually generated according to a random or pseudo-random technique. Public-key encryption utilizes a private key/public key pair. The keys are related such that a message encrypted with the private key can be decrypted with the public key and vice versa, but the public key and message cannot be used (at least in a reasonable amount of time) to calculate the private key. The entity generating the keys can use conventional techniques to generate the key pairs, including, for example, techniques utilizing the Diffie-Hellman, Knapsack, DSA, and/or RSA key-generation schemes. The private keys 234 are stored in the protected area 222 of the storage device 208 and loaded into the protected area 226 of memory 206 when utilized by the processor 202.

Digital signatures rely upon public-key cryptography techniques to "prove" that an unaltered message was received from a known party. A message encrypted with a private key can be decrypted by only the corresponding public key. Moreover, the decryption will fail if the message and/or public key has been altered. Thus, if the end-user computer system 114 "knows" the true public key of the CA 110 and uses that key to decrypt a message received from the CA, the end-user system 114 can be "sure" that the message was sent by the CA and was not modified.

The code signing module 232 obtains 312 a certificate for the key pair. In an embodiment where the code signing module 232 obtains the certificate from the CA 110, the module 232 communicates with the CA 110 and "proves" to the CA that it is executing on a trusted computing platform and neither the module nor the platform have been compromised. If the code signing module 232 generated the keys itself, the module 232 sends the public key to the CA 110 in order to obtain 312 the certificate. In one embodiment, the code signing module 232 also sends identifying information to the CA 110, such as the machine ID 203, the name of the developer or enterprise to which the developer belongs, etc.

In response, the CA 110 creates a certificate specifying the public key and, optionally, the machine ID of the developer system 112 and/or other identifying information. The CA 110 signs (i.e., encrypts) the certificate with the CA's private key and sends the certificate to the developer system 112. In one embodiment, the CA 110 retains the machine ID and/or other identifying information in order to allow the developer to be explicitly identified from the certificate even if there is no identifying information in the certificate itself (e.g., the certificate can have a serial number which the CA cross-references with the identifying information). In another embodiment, the CA 110 discards the machine ID and/or other identifying information in order to render the developer anonymous if there is no identifying information in the certificate.

In one embodiment, the code signing module 232 generates the keys itself (and/or utilizes keys associated with the trusted computing platform) and also generates the certificate itself. This certificate can be trusted by third parties because the trusted computing platform on the developer computer system 112 itself is trustworthy.

The developer uses the SDS 228 to develop 314 the software 230. At some point, the SDS 228 will build a version of the software 230 and activate the code signing module 232 to sign the software. In one embodiment, the SDS 228 is adapted to use the code signing module 232 to sign the software every time the SDS compiles and links the code forming the software. This embodiment ensures that all software produced by the SDS 228 is signed. In another embodiment, the SDS 228 can be configured to sign only certain software.

The code signing module 232 uses a hash function to compute a hash of the software. As is known in the art, a "hash function" is a function, mathematical or otherwise, that takes an input string and converts it to a fixed-size output string. In one embodiment, the code signing module 232 uses the software 230 as the input to the hash function and obtains a much smaller output string (the "hash"). The hash function is selected so that any change to the software 230 will produce a change in the hash. Therefore, the hash acts as a sort of fingerprint of the software 230. Examples of hash functions that can be used by embodiments of the present invention include MD5 and SHA.

In one embodiment, the code signing module 232 uses the private key 234 to encrypt the hash. In another embodiment, the private key 234 is utilized by the hash function itself to produce the hash, thereby eliminating the need to perform a discrete encryption of the hash. In one embodiment, the code signing module 232 also uses the machine ID 203 during this process. For example, the machine ID 203 can be included in the hashed software, used to influence the hash function, etc. The module 232 stores the encrypted hash and the certificate containing the public key corresponding to the private key used to encrypt the hash in the software, which effectively signs 316 the software. In one embodiment, the code signing module 232 signs all software developed using the SDS 228 with the same key pair and certificate. In another embodiment, different software developed using the SDS 228 is signed with different key pairs and certificates.

The code signing module 232 passes the signed software 230 out to the unprotected memory area 224. At this point, the code signing module 232 has no further use for the private key. Accordingly, the key can be destroyed or, if there is a desire to save the key, held in the protected area 222 of the storage device 208 or held in escrow.

The developer distributes 318 the signed software 230 to end-users via standard distribution channels, such as by selling boxed software at retail stores and/or making the software available for download from the Internet. At some point, an end-user attempts to execute the signed software 230 on an end-user system 114.

In one embodiment, the OS or other program modules on the end-user system 114 verify 320 the software's signature before executing it. In one embodiment, the end-user system 114 uses the hashing function to recalculate the hash for the software. Then, the end-user system 114 decrypts the certificate using the CA's public key and uses the developer's public key contained therein to decrypt the encrypted hash distributed with the software. If the hash of the software generated by the end-user system 114 matches the decrypted hash distributed with the software, the software 230 has not been altered and is presumably safe to execute 320 on the end-user system.

In one embodiment, the end-user system 114 verifies 320 the software's signature each time it executes the code. If a parasitic virus, Trojan horse, worm, keystroke grabber, or other malicious code infects the end-user system 114 and modifies the file containing the software 230, the modification will cause the verification to fail. As discussed above, in one embodiment the end-user system 114 is configured to execute only signed software. In another embodiment, the end-user system 114 executes only signed software, but does not necessarily verify that the signatures are valid. Rather, the system 114 treats the signature itself as a guarantee that the software was created by a trusted computing platform and, therefore, is not malicious (this is especially true if the signature explicitly identifies the developer). In another embodiment, the end-user system 114 does not verify that the signatures are valid yet the greater prevalence of signed software due to the present invention results in a generally safer computing environment than in the past.

In one embodiment, the end-user system 114 maintains a list of hashes or other data in signatures that identify software known to be malicious. For example, the end-user system 114 can obtain this list from a provider of anti-virus software via the network 116. The end-user system 114 compares the signatures of new software installed on the system against the data in the list in order to detected signed software that is malicious.

Thus, the SDS 228 according to the present invention allows a software developer to easily develop signed software. The code signing module 232 handles the key management, certificate management, and code signing aspects of the process in a manner transparent to the developer. Accordingly, the present invention facilitates an increase in the use of signed code and correspondingly lessens the impact of malicious code on end-user computer systems 114. In certain embodiments, the present invention also allows the developer computer system 112 to be explicitly identified.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A software development system having a trusted computing platform, comprising:
    a processor;
    a memory having an unprotected area and a protected area; and
    a computer readable storage medium storing computer program instructions adapted to be executed by the processor, the computer program instructions comprising:
        a software development module adapted to execute in the unprotected area of the memory to facilitate development of software;
        a code signing module adapted to execute in the protected area of the memory to:
            authenticate the software development module; and
            responsive to successful authentication of the software development module;
                receive in the protected area the software developed with the development module; and automatically sign the software in the protected area with a digital signature; and an interface adapted to pass the software from the unprotected area to the protected area for signing of the software, and to pass the signed software from the protected area to the unprotected area after signing of the software.

2. The system of claim 1, wherein the code signing module is further adapted to communicate with a certificate authority to obtain a certificate for use in signing the software.

3. The system of claim 1, wherein the code signing module is further adapted to include a machine ID with the digital signature, the machine ID uniquely identifying the trusted computing platform.

4. The system of claim 1, wherein the code signing module is further adapted to obtain at least one private/public key pair for use in signing the software and wherein the code signing module is further adapted to store the private key in the protected area of the memory.

5. The system of claim 1, wherein the interface includes an application programming interface (API) supporting communications between the protected area and the unprotected area and wherein the software development module is adapted to utilize the API to pass the developed software to the code signing module in the protected area.

6. A method for developing software using a computer system having a trusted computing platform, the method comprising:

developing software using a software development module executing in an unprotected area of a memory within the trusted computing platform and executed by a processor;

authenticating the software development module to a code signing module executing in a protected area of the memory within the trusted computing platform; and responsive to a successful authentication of the software development module:

passing the software from the unprotected area of the memory into the protected area of the memory;

automatically and digitally signing the software in the protected area of the memory; and passing the signed software out of the protected area to the unprotected area of the memory.

7. The method of claim 6, wherein digitally signing the software comprises:

obtaining a private/public key pair for the signature;

obtaining a certificate for the signature responsive to the public key;

signing the developed software with the private key; and including the certificate with the signed software.

8. The method of claim 7, wherein obtaining a private/public key pair comprises:

generating the private/public key pair on the computer system.

9. The method of claim 7, wherein obtaining a private/public key pair comprises:

obtaining the private/public key pair from a certificate authority in communication with the computer system.

10. The method of claim 7, further comprising:

storing the private key in the protected area of the memory.

11. The method of claim 7, further comprising:

including a machine ID with the signed software, wherein the machine ID uniquely identifies the computer system.

12. The method of claim 6, further comprising:

providing the signed software to an end-user computer system, wherein the end-user computer system is adapted to verify the signature of the signed software to detect tampering with the software and execute the software responsive to a positive verification of the signature.

13. The method of claim 12, wherein the end-user computer system is adapted to execute only signed software.

14. The method of claim 12, wherein the end-user computer system is adapted to compare the signature of the signed software against a list of data identifying malicious software in order to identify signed malicious software.

15. A computer program product comprising:

a computer-readable medium having computer program logic embodied therein for executing on a trusted computing platform having a memory that includes a protected area and an unprotected area, the computer program logic comprising:

a software development module adapted to execute in the unprotected area of the memory to facilitate development of software;

a code signing module adapted to execute in the protected area of the memory to:

authenticate the software development module; and responsive to successful authentication of the software development module:

receive in the protected area the software developed by the software development module; and automatically sign the software in the protected area with a digital signature; and an interface adapted to pass the software from the unprotected area to the protected area for signing the software, and to pass the signed software from the protected area to the unprotected area after signing the software.

16. The computer program product of claim 15, wherein the code signing module is further adapted to communicate with a certificate authority to obtain a certificate enabling verification of the digital signature.

17. The computer program product of claim 15, wherein the code signing module is further adapted to include a machine ID with the digital signature, the machine ID uniquely identifying the trusted computing platform.

18. The computer program product of claim 15, wherein the code signing module is further adapted to obtain at least one private/public key pair for use in signing the software and wherein the code signing module is further adapted to save the private key in the protected area of the memory.

19. The computer program product of claim 15, wherein the interface includes an application programming interface (API) supporting communications between the protected area and the unprotected area and wherein the software development module is adapted to utilize the API to pass the developed software to the code signing module in the protected area.

* * * * *